US011026166B2

(12) United States Patent
Huang et al.

(10) Patent No.: US 11,026,166 B2
(45) Date of Patent: Jun. 1, 2021

(54) APPLICATION DRIVEN DYNAMIC NETWORK SLICE SELECTION

(71) Applicant: Verizon Patent and Licensing Inc., Arlington, VA (US)

(72) Inventors: Ye Huang, San Ramon, CA (US); Suzann Hua, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 16/435,100

(22) Filed: Jun. 7, 2019

(65) Prior Publication Data
US 2020/0389843 A1    Dec. 10, 2020

(51) Int. Cl.
*H04W 48/18* (2009.01)
*H04W 8/08* (2009.01)
*H04W 68/00* (2009.01)
*H04W 60/04* (2009.01)

(52) U.S. Cl.
CPC ............ *H04W 48/18* (2013.01); *H04W 8/08* (2013.01); *H04W 60/04* (2013.01); *H04W 68/005* (2013.01)

(58) Field of Classification Search
CPC ....... H04W 48/18; H04W 8/08; H04W 60/04; H04W 68/005
USPC ........................................................ 455/452.1
See application file for complete search history.

(56) References Cited

U.S. PATENT DOCUMENTS

2019/0053147 A1*  2/2019  Qiao .................. H04W 4/24
2020/0187106 A1*  6/2020  Salkintzis ............ H04W 48/00

* cited by examiner

*Primary Examiner* — Charles N Appiah
*Assistant Examiner* — Frank E Donado

(57) ABSTRACT

A computer device may include a memory storing instructions and processor configured to execute the instructions to receive a session request from an application function (AF) device for a user equipment (UE) device and select a network slice based on the AF device. The computer device may be further configured to send a slice selection trigger to an Access and Mobility Function device for the UE device in response to selecting the network slice, wherein the slice selection trigger includes an instruction to UE device to request the selected network slice; receive a notification from a User Plane Function device associated with the selected slice, wherein the notification identifies a Packet Data Unit session between the UPF device and the UE device; and instruct the AF device to start a session with the UE device via the identified PDU session.

20 Claims, 9 Drawing Sheets

APPLICATION DRIVEN DYNAMIC NETWORK SLICE SELECTION

BACKGROUND INFORMATION

In order to satisfy the needs and demands of users of mobile communication devices, providers of wireless communication services continue to improve and expand available services as well as networks used to deliver such services. One aspect of such improvements includes the development of core networks as well as options to utilize such core networks. A core network may manage a large number of devices experiencing different conditions. Managing all the different devices associated with different conditions poses various challenges.

DETAILED DESCRIPTION OF PREFERRED EMBODIMENTS

Figure 1:
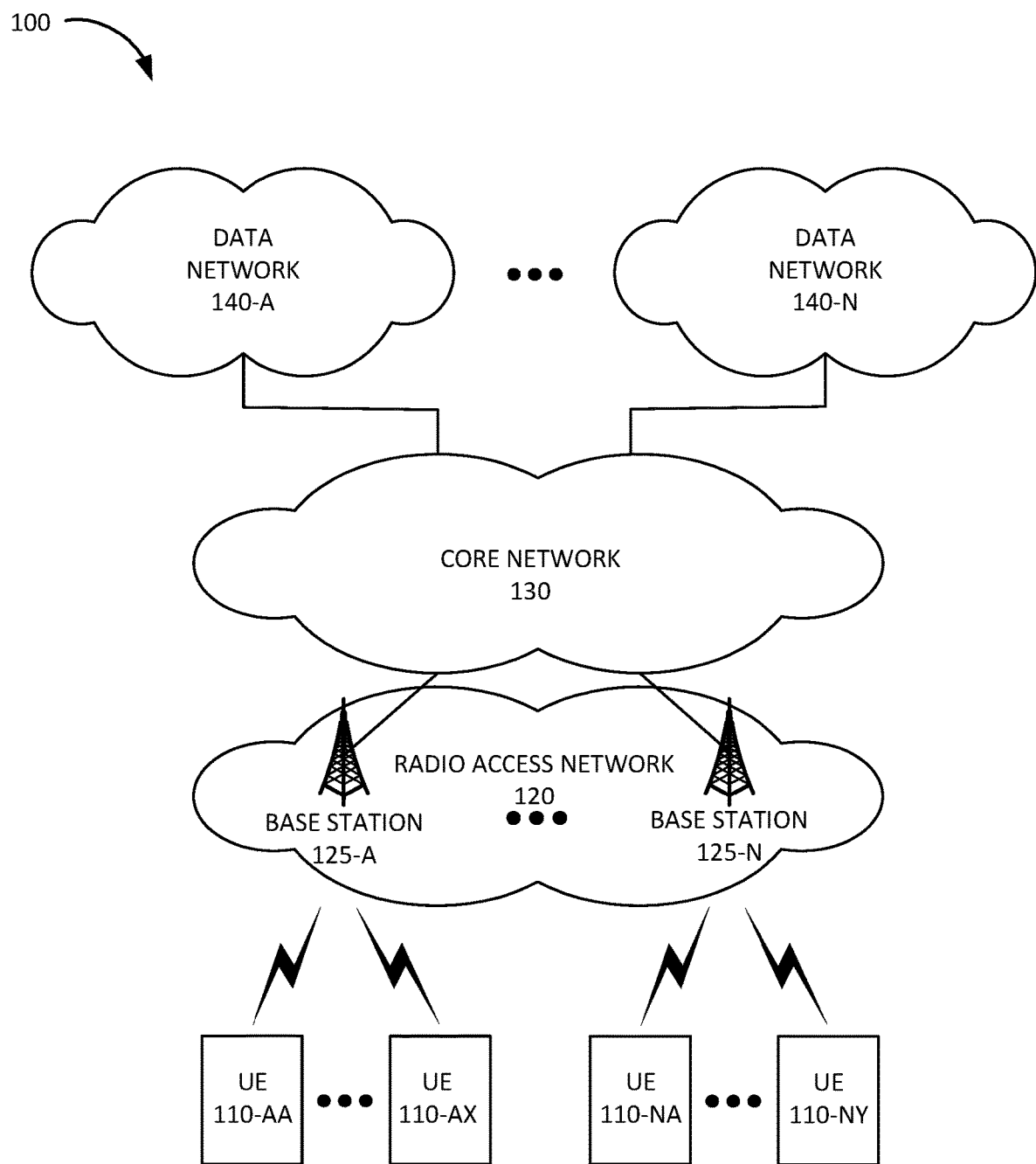
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks have become increasingly more complex. One way in which wireless access networks are continuing to become more complicated is by incorporating various aspects of next generation networks, such as Fifth Generation (5G) mobile networks, utilizing high frequency bands (e.g., 24 Gigahertz (GHz), 39 GHz, etc.), and/or lower frequency bands such as Sub 6 GHz, and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

Moreover, improvements in the core networks of 5G wireless access networks provide new functionality, such as, for example, network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, configured to implement a different set of requirements and/or priorities, and/or may be associated with a particular Quality of Service (QoS) class, type of service, and/or particular enterprise customer associated with a set of UE devices.

Examples of network slices that may be implemented in a 5G network may include a default network slice used for sessions not associated with a particular network slice; an enhanced Mobile Broadband (eMBB) network slice for Voice over Internet Protocol (VoIP) telephone calls and/or data sessions for accessing Internet websites; a massive Internet of Things (mIoT) network slice for IoT devices; an Ultra-Reliable Low Latency Communication (URLLC) network slice for URLLC communication, such as medical monitoring devices, autonomous vehicles, industrial automation, etc.; and/or other types of network slices. For example, a Mobile Private Network (MPN) for a particular enterprise may be associated with an MPN network slice.

When a UE device is configured and activated by a wireless network, the UE device may be configured to connect to one or more particular network slices. The allowed slices for the UE device may be configured using a Network Slice Selection Function (NSSF) device and stored in a subscription profile, associated with the UE device, in a Unified Data Management (UDM) device. When the UE device requests a connection to a particular network slice, the UE may send a request to the Access and Mobility Function (AMF) device and the AMF device may provide a list of allowed network slices to the UE device. The UE device may then request a Packet Data Unit (PDU) connection with one or more of the allowed network slices.

Therefore, the slice selection for a UE device may be performed statically during the initial configuration of the UE device. Furthermore, a UE device may connect to multiple network slices even though the UE device may not use each of the multiple network slices at any particular time.

Implementations described herein relate to application driven dynamic network slice selection. A 5G network may be configured to dynamically select a particular network slice for a UE device based on the type of service or connection required by the UE device. For example, the particular network slice may be selected based on a request from an Application Function (AF) device for a particular type of session for the UE device. The AF device may be associated with an application on the UE device. For example, the UE device may run a medical monitoring application and the AF device may correspond to, or interface with, a server device associated with the medical monitoring application.

The AF device may send the request in response to the AF device selecting to communicate with the UE device or in response to the UE device sending an application request to the AF device (e.g., via a default network slice). The AF device may send the request to a 5G Network Exposure Function (NEF) device configured to interface the 5G core network with AF devices. The NEF device may be configured to include a slice manager that selects a network slice for the UE device based on the request received from the AF device. The NEF device may include a slice database (DB) that stores information relating network slices to AF devices. The NEF device may receive information relating to available network slices from a NSSF device, including information identifying any newly added slices to the network. In some implementations, the NEF device may send an update relating to available network slices to AF devices based on information received from the NSSF device relating to the available network slices, including the information identifying any newly added slices to the network.

For example, the NEF device may be configured to receive a session request from an AF device for a UE device; select a network slice based on AF device; send an updated allowed slices list for the UE device to a Unified Data Management (UDM) device based on the selected network slice; and send a slice selection trigger to an AMF device for the UE device in response to selecting the network slice. The slice selection trigger may include an instruction to the UE device to request the selected network slice. In some implementations, the session request received from the AF device may be received via a Representational State Transfer (REST) Application Programming Interface (API).

The NEF may be further configured to receive a notification, from a User Plane Function (UPF) device associated with the selected slice, which identifies a PDU session between the UPF device and the UE device, and instruct the AF device to start a session with the UE device via the identified PDU session between the UPF device and the UE device.

In some implementations, the 5G core network may include a signaling network slice that is used for sending management plane and/or control plane messages to devices in the 5G core network, to base stations, and/or to UE devices. For example, the signaling network slice may be used to send instructions to UE devices to request a particular network slice. Thus, the slice selection trigger may be sent by the NEF device to a signaling slice AMF associated with the signaling network slice. After the UE device receives the instruction from the signaling slice AMF, the UE device may send a PDU connection request to another AMF associated with the selected network slice and the NEF device may receive a notification from the selected slice AMF device indicating that the UE device has requested a session using the selected network slice.

The terms "NEF device," "NSSF device," "AF device," "UPF device," and/or other network devices described herein, may refer to a dedicated hardware component implementing a network function instance via software, or to a hardware component that is part of a common shared physical infrastructure used to implement virtualized network function instances using SDN or another type of virtualization technique. Thus, the network device may be configured to implement a particular network function instance as a Virtual Network Function (VNF) (e.g., in a virtual machine), as a Cloud-native Network Function (CNF) (e.g., in a container), as a serverless architecture event handler, and/or using a different type of virtualization. The common shared physical infrastructure may be implemented using one or more computer devices in a cloud computing center, a Multi-Access Edge Computing (MEC) system associated with a base station, and/or in another type of computer system.

FIG. 1 is a diagram of an exemplary environment 100 in which the systems and/or methods, described herein, may be implemented. As shown in FIG. 1, environment 100 may include UE devices 110-AA to 110-NY (referred to herein collectively as "UE devices 110" and individually as "UE device 110"), a radio access network 120, a core network 130, and data networks 140-A to 140-N.

UE device 110 may include any device with wireless communication functionality (e.g., using a cellular or mobile wireless network). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

Radio access network 120 may enable UE devices 110 to connect to core network 130 for mobile telephone service, Short Message Service (SMS) message service, Multimedia Message Service (MMS) message service, Internet access, cloud computing, and/or other types of data services. Radio access network 120 may include base stations 125-A to 125-N (referred to herein collectively as "base stations 125" and individually as "base station 125"). Each base station 125 may service a set of UE devices 110. For example, base station 125-A may service UE devices 110-AA to 110-AX, etc., and base station 125-N may service UE devices 110-NA to 110-NY. In other words, UE devices 110-AA to 110-AX may be located within the geographic area serviced by base station 125-A, and other UE devices 110 may be serviced by another base station 125.

Base station 125 may include a 4G LTE base station (e.g., an evolved Node B (eNodeB)) or a 5G NR base station (e.g., a next generation Node B (gNodeB)). Base station 125 may include one or more radio frequency (RF) transceivers (also referred to as "cells" and/or "base station sectors") facing particular directions. For example, base station 125 may include three RF transceivers and each RF transceiver may service a 120° sector of a 360° field of view. If base station 125 includes a 5G NR base station, each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 125 may also include a 4G base station (e.g., an eNodeB). Furthermore, in some implementations, base station 125 may include a MEC system that performs processing services for UE devices 110.

Core network 130 may manage communication sessions for UE devices 110. For example, core network 130 may establish an Internet Protocol (IP) connection between UE device 110 and a particular data network 140. Furthermore, core network 130 may enable UE device 110 to communicate with an application server, and/or another type of device, located in a particular data network 140 using a communication method that may not require the establishment of an IP connection between UE device 110 and data network 140, such as, for example, Data over Non-Access Stratum (DoNAS).

In some implementations, core network 130 may include a 4G LTE core network (e.g., an evolved packet core (EPC) network). In other implementations, core network 130 may include a Code Division Multiple Access (CDMA) network. For example, the CDMA network may include a CDMA enhanced High Rate Packet Data (eHRPD) network (which may provide access to an LTE network).

Furthermore, core network 130 may include an LTE Advanced (LTE-A) network and/or a 5G core network or other advanced network that includes functionality such as management of 5G NR base stations in radio access network 120, which may implement carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band IoT (NB-IoT) technology, and/or other types of MTC technology; and/or other types of LTE-A and/or 5G functionality.

Data networks 140-A to 140-N (referred to herein collectively as "data networks 140" and individually as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 140 may be managed by a communication services provider that also manages core network 130, radio access network 120, and/or particular UE devices 110.

In some implementations, a particular data network 140 may include an IP Multimedia Subsystem (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
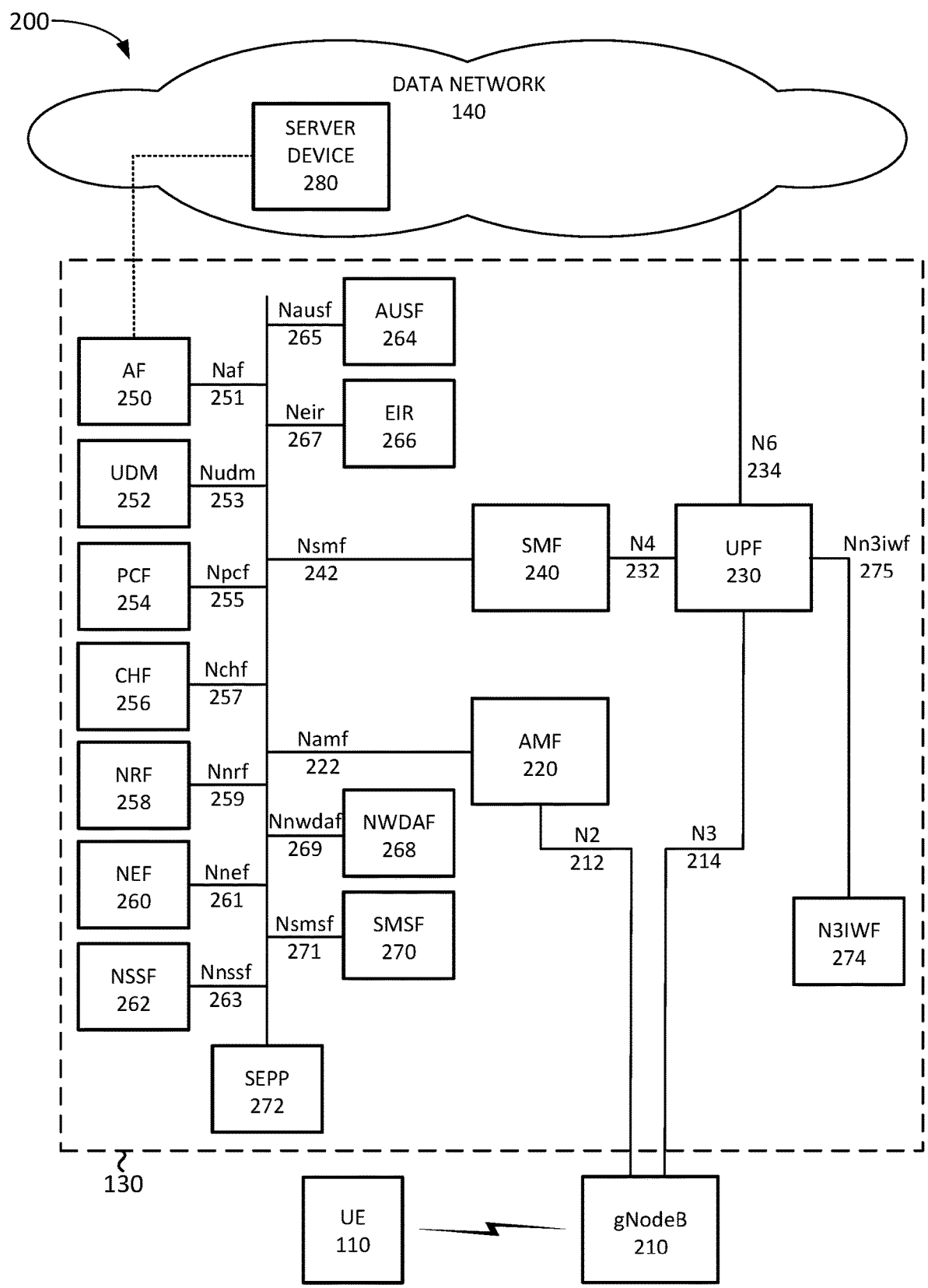
FIG. 2 is a diagram illustrating exemplary components of the core network of FIG. 1 according to an implementation described herein.

FIG. 2 illustrates a system 200 that includes exemplary components of core network 130 in the context of environment 100 according to an implementation described herein. As shown in FIG. 2, system 200 may include UE device 110, gNodeB 210, core network 130, and data network 140.

gNodeB 210 may correspond to base station 125. gNodeB 210 may include one or more devices (e.g., base stations) and other components and functionality that enable UE device 110 to wirelessly connect to core network 130 using 5G NR Radio Access Technology (RAT). For example, gNodeB 210 may service one or more cells, with each cell being served by a wireless transceiver with an antenna array configured for mm-wave wireless communication, and/or for lower frequency bands such as Sub 6 GHz. gNodeB 210 may communicate with AMF 220 using an N2 interface 212 and communicate with UPF 230 using an N3 interface 214.

Core network 130 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 130 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a VNF virtual machine, a CNF container, an event driven serverless architecture interface, and/or another type of SDN architecture. The common shared physical infrastructure may be implemented using one or more devices 400 described below with reference to FIG. 4 in a cloud computing center associated with core network 130. Additionally, or alternatively, some, or all, of the common shared physical infrastructure may be implemented using one or more devices 400 described below with reference to FIG. 4 using a MEC system associated with base stations 125.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network 140 (e.g., an IMS network, a MPN, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a Radio Access Network node (e.g., gNodeB 210), and/or perform other types of user plane processes. UPF 230 may communicate with SMF 240 using an N4 interface 232 and connect to data network 140 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, a third-party application running on server device 280 in a particular data network 140, and/or other types of applications. AF 250 may be accessible via an Naf interface 251, also referred to as an NG5 interface. For example, server device 280 may be configured to communicate with, or to function as, a particular AF 250 (shown as the dotted line connecting AF 250 and server device 280 in FIG. 2).

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may store, in a subscription profile associated with a particular UE device 110, a list of network slices which the particular UE device 110 is allowed to access. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for core network 130. CHF 256 may be accessible via Nchf interface 257.

NRF 258 may support a service discovery function and maintain profiles of available network function (NF) instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 258 may include one or more transport network Key Performance Indicators (KPIs) associated with the NF instance. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 130, translate information between core network 130 and devices/networks external to core network 130, support a Packet Flow Description (PFD) function, and/or perform other types of network exposure functions. NEF 260 may include a slice manager that selects a network slice for a particular UE device 110 based on a request received from a particular AF 250, as described herein. NEF 260 may be accessible via Nnef interface 261.

NSSF 262 may select a set of network slice instances to serve a particular UE device 110, determine network slice selection assistance information (NSSAI), determine a particular AMF 220 to serve a particular UE device 110, and/or perform other types of processing associated with network slice selection or management. NSSF 262 may provide a list of allowed slices for a particular UE device 110 to UDM 252 to store in a subscription profile associated with the particular UE device 110. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to see if a PEI has been blacklisted. EIR 266 may be accessible via Neir interface 267.

NWDAF 268 may collect analytics information associated with radio access network 120 and/or core network 130. For example, NWDAF 268 may collect accessibility KPIs (e.g., an Radio Resource Control (RRC) setup success rate, a Radio Access Bearer (RAB) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi access point (not shown in FIG. 2). N3IWF 274 may facilitate handovers for UE device 110 between radio access network 120 and the non-3GPP access device. N3IWF 274 maybe accessible via Nn3iwf interface 275.

Although FIG. 2 shows exemplary components of core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. For example, core network 130 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 130 may include a reference point architecture that includes point-to-point interfaces between particular function nodes.

Figure 3:
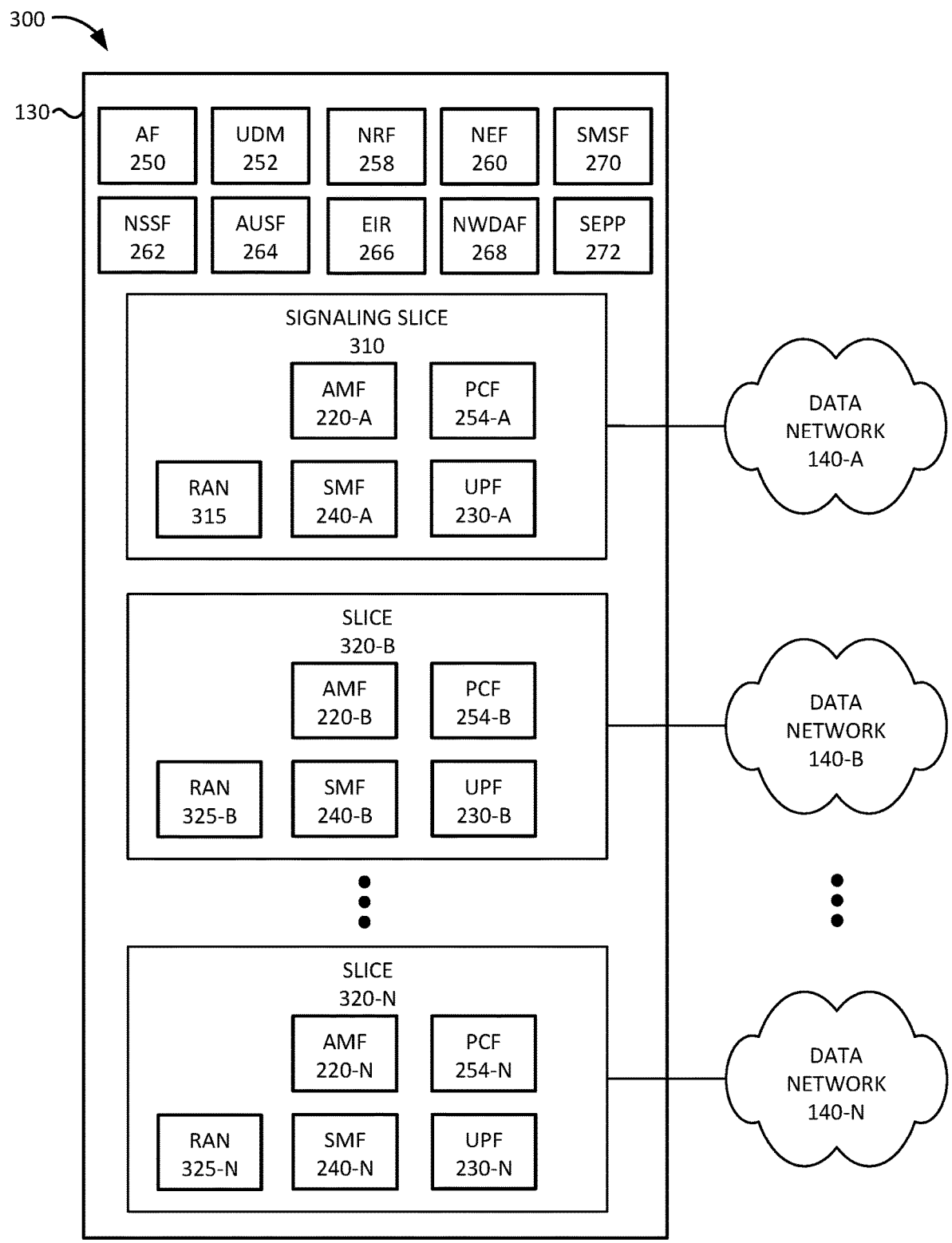
FIG. 3 is a diagram illustrating exemplary components of different slices of the core network of FIG. 1 according to an implementation described herein.

FIG. 3 is a diagram of a system 300 illustrating exemplary components of different slices of core network 130. As shown in FIG. 3, system 300 may include core network 130 and data networks 140-A to 140-N. Core network 130 may include a set of network functions common to all network slices, a signaling network slice 310, and network slices 320-B to 320-N (referred to herein collectively as "network slices 320" and individually as "network slice 320").

For example, network functions that are common to all network slices may include AF 250, UDM 252, NRF 258, NEF 260, NSSF 262, AUSF 264, EIR 266, NWDAF 268, SMSF 270, and SEPP 272. In other implementations, a different set of network functions may be common to all the network slices. Furthermore, some network functions may be shared by two or more network slices, while other network slices may include separate instances of those network functions.

Signaling network slice 310 may be configured to send management plane and/or control plane messages to UE devices 110, base stations 125, and/or network functions in core network 130. For example, signaling network slice 310 may be used to send instructions to UE devices 110 to request a particular network slice from network slices 320-B to 320-N. Furthermore, signaling network slice 310 may monitor the reachability of particular UE devices 110. Signaling network slice 310 may include a RAN 315, AMF 220-A, UPF 230-A, SMF 240-A, and PCF 254-A. RAN 315 may include one or more gNodeBs 210 that are associated with signaling network slice 310. While a single AMF 220-A, UPF 230-A, SMF 240-A, and PCF 254-A are shown in signaling network slice 310 for illustrative purposes, in practice, signaling network slice 310 network may include multiple AMFs 220-A, UPFs 230-A, SMFs 240-A, and/or PCFs 254-A.

Each of network slices 320 may be configured to communicate with a particular one of data networks 140. Network slice 320 may include a RAN 325, AMF 220, UPF 230, SMF 240, and PCF 254. RAN 325 may include one or more gNodeBs 210 that are associated with network slice 320. While a single AMF 220, UPF 230, SMF 240, and PCF 254 are shown in network slice 320 for illustrative purposes, in practice, signaling network slice 310 network may include multiple AMFs 220, UPFs 230, SMFs 240, and/or PCFs 254. Network slices 320 may include a default network slice used when a particular network slice is not selected by UE device 110, an eMBB network slice 320, an mIoT network slice 320, a URLLC network slice 320, and/or one or more MPN network slices 320 associated with particular enterprises.

Although FIG. 3 shows exemplary components of system 300, in other implementations, system 300 may include fewer components, different components, differently arranged components, or additional components than depicted in FIG. 3. Additionally, or alternatively, one or more components of system 300 may perform functions described as being performed by one or more other components of system 300.

Figure 4:
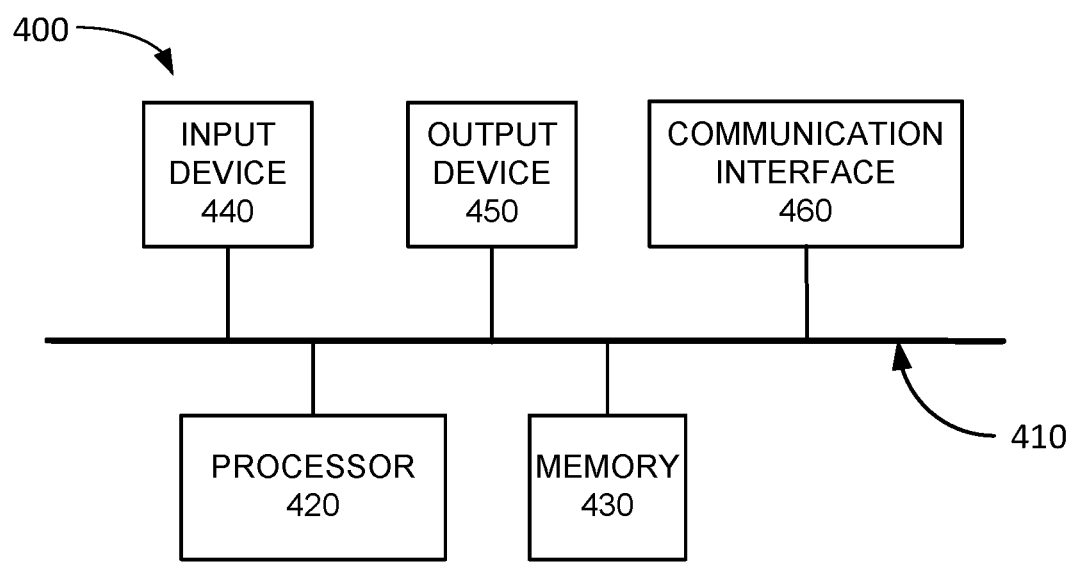
FIG. 4 is a diagram illustrating exemplary components of a device that may be included in a component of FIG. 1, FIG. 2, or FIG. 3 according to an implementation described herein.

FIG. 4 illustrates example components of a device 400 according to an implementation described herein. UE device 110, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, server device 280, and/or other components of core network 130 and/or data network 140, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to selection of a network slice. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
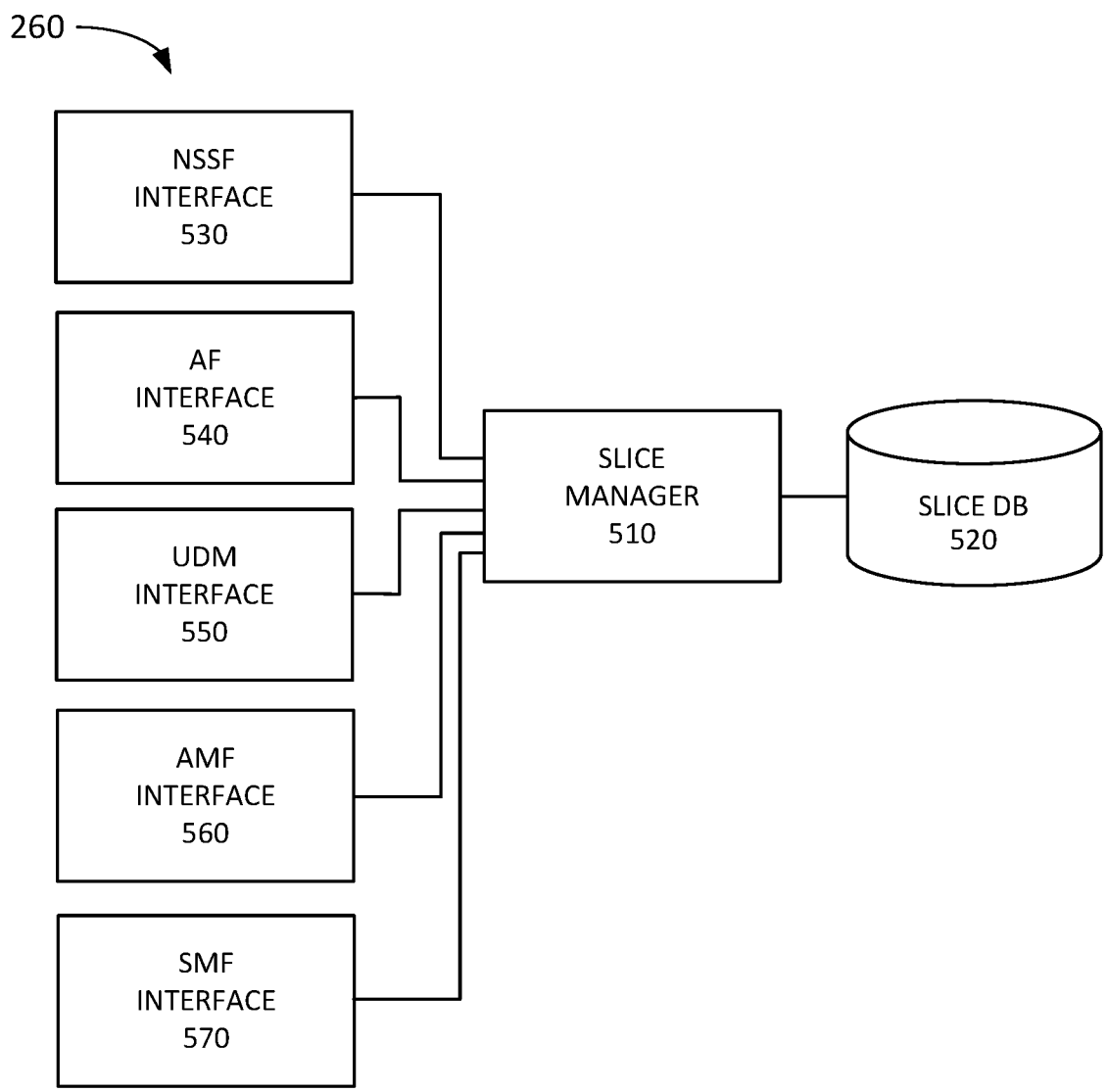
FIG. 5 is a diagram illustrating exemplary components of the Network Exposure Function device of FIG. 2 according to an implementation described herein.

FIG. 5 illustrates exemplary components of NEF 260. The components of NEF 260 may be implemented, for example, via processor 420 executing instructions from memory 430. Alternatively, some or all of the components of NEF 260 may be implemented via hard-wired circuitry. As shown in FIG. 5, NEF 260 may include s slice manager 510, a slice DB 520, an NSSF interface 530, an AF interface 540, a UDM interface 550, an AMF interface 560, and a SMF interface 570.

Slice manager 510 may select a particular network slice 320 for a particular UE device 110 based on a request received from AF 250 using information stored in slice DB 520. Exemplary information that may be stored in slice DB 520 is described below with reference to FIG. 6. NSSF interface 530 may be configured to communicate with NSSF 262. For example, NSSF interface 530 may receive from NSSF 262 a list of network slices 320 present in core network 130 and/or a list of allowed network slices 320 for a particular UE device 110. Slice manager 510 may store the information received via NSSF interface 530 in slice DB 520.

AF interface 540 may be configured to communicate with AF 250. In some implementations, AF interface 540 may implement a REST API that AF 250 may use to communicate with NEF 260. For example, AF 250 may use the REST API to send a service request for a particular UE device 110, to receive a notification when a PDU session for the particular UE device 110 has been established, and/or to request that a particular network slice 320 be added to the allowed slice list for the particular UE device 110. Furthermore, AF 250 may use the REST API to subscribe to network slice updates to be notified when there is a change in the network slices 320 available in core network 130. UDM interface 550 may be configured to communicate with UDM 252. For example, slice manager 510 may send an updated list of allowed network slices 320 for a particular UE device 110 to UDM 252 based on information received from AF 250 and stored in slice DB 520.

AMF interface 560 may be configured to communicate with AMF 220. For example, slice manager 510 may send a slice selection trigger to signaling AMF 220-A to instruct UE device 110 to select a particular network slice 320 and may receive an acknowledgment from signaling AMF 220-A that UE device 110 has successfully received the slice selection trigger. Furthermore, AMF interface 560 may receive a notification from AMF 220 in the selected network slice 320 that UE device 110 has requested a PDU session connection using the selected network slice 320. SMF interface 570 may be configured to communicate with SMF 240. For example, SMF interface 570 may receive a notification from SMF 240 in the selected network slice 320 that UE device 110 has established a PDU session with UPF 230. Slice manager 510 may send information relating to the established PDU session to AF 250 via AF interface 540.

Although FIG. 5 shows exemplary components of NEF 260, in other implementations, NEF 260 may include fewer components, different components, additional components, or differently arranged components than depicted in FIG. 5. Additionally, or alternatively, one or more components of NEF 260 may perform one or more tasks described as being performed by one or more other components of NEF 260. For example, in some implementations, slice DB 520 may be stored and/or maintained by UDM 252, rather than by NEF 260.

Figure 6:
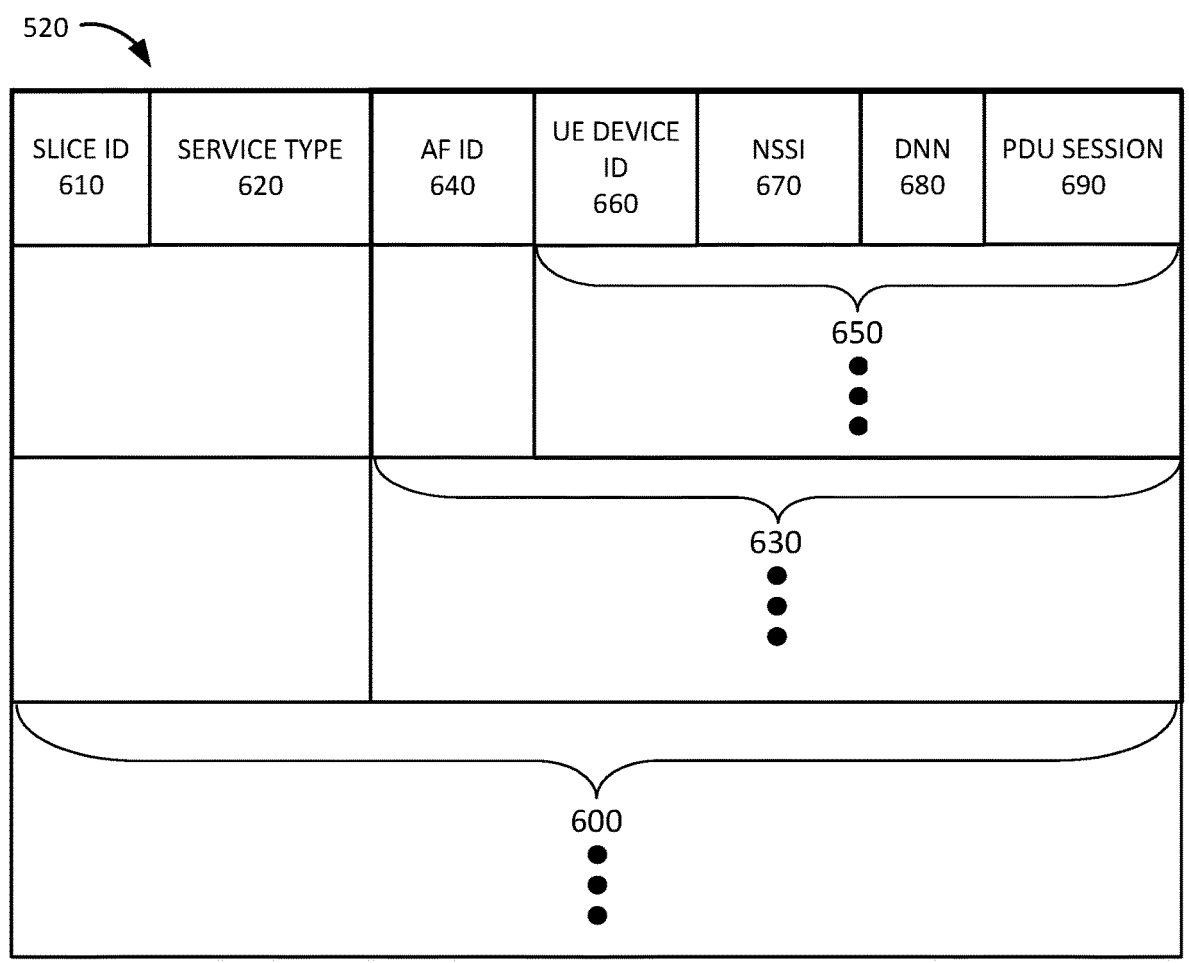
FIG. 6 is a diagram illustrating exemplary components that may be stored in the slice database of FIG. 5 according to an implementation described herein.

FIG. 6 illustrates exemplary components of slice DB 520. As shown in FIG. 6, slice DB 520 may include one or more slice records 600. Each slice record 600 may store information relating to a particular network slice 320. Slice record 600 may include a slice identifier (ID) field 610, a service type field 620, and one or more AF records 630. Slice ID field 610 may include a slice ID associated with a particular network slice 320. Service type field 620 may store information identifying one or more service types associated with the particular network slice 320. For example, service type field 620 may identify a Quality of Service (QoS) class (e.g., VoIP, real-time video, live gaming, URLLC, MTC, priority data, best effort data, etc.), a type of traffic associated with the particular network slice 320, whether the particular network slice 320 is associated with an MPN, and/or other types of information used to identify the types of services associated with the particular network slice 320.

Each AF record 630 may store information relating to a particular AF 250 associated with the particular network slice 320. AF record 630 may include an AF ID field 640 and one or more UE device records 650. AF ID field 640 may store information identifying a particular AF 250. Each UE device record 650 may store information identifying a particular UE device 110 associated with the particular AF 250. UE device record 650 may include a UE device ID field 660, a Network Slice Subnet Instance (NSSI) field 670, a Data Network Name (DNN) field 680, and a PDU session field 690.

UE device ID field 660 may store one or more IDs associated with the particular UE device 110. For example, UE device ID field 660 may store an International Mobile Equipment Identity (IMEI), an International Mobile Subscriber Identity (IMSI), a Mobile Directory Number (MDN), a Mobile Station International Subscriber Directory Number (MSISDN), a Globally Unique Temporary Identity (GUTI), a Cell Radio Network Temporary Identity (CRTNI), an IP address, a Media Access Control (MAC) address, and/or another type of identifier associated with UE device 110.

NSSI field 670 may store one or more NSSIs associated with the particular UE device 110. Each NSSI may correspond to an ID for a particular network slice 320 and may identify that the particular UE device 110 is allowed to access the particular network slice 320. DNN field 680 may identify one or more DNNs associated with the particular UE device 110. Each DNN may identify a particular data network 140 to which UE device 110 is allowed to connect. For example, a particular DNN may correspond to a particular NSSI associated with the particular UE device 110. PDU session field 690 may identify a PDU session associated with the particular UE device 110. For example, after the particular UE device 110 connects to data network 140 using UPF 230 in a selected slice, SMF 240 may provide information identifying the PDU session associated with the particular UE device 110 to slice manager 510 and slice manager 510 may store the information identifying the PDU session in PDU session field 690.

Although FIG. 6 shows exemplary components/fields of slice DB 520, in other implementations, slice DB 520 may store fewer components/fields, different components/fields, additional components/fields, or differently arranged components/fields than depicted in FIG. 6. Additionally, or alternatively, one or more components/fields of slice DB 520 may store information described as being stored by one or more other components/fields of slice DB 520. For example, while FIG. 6 shows slice DB 520 organized based on network slices 320, in other implementations, slice DB 520 may be organized based on AFs 250, based on UE devices 110, and/or based on another organization scheme.

Figure 7:
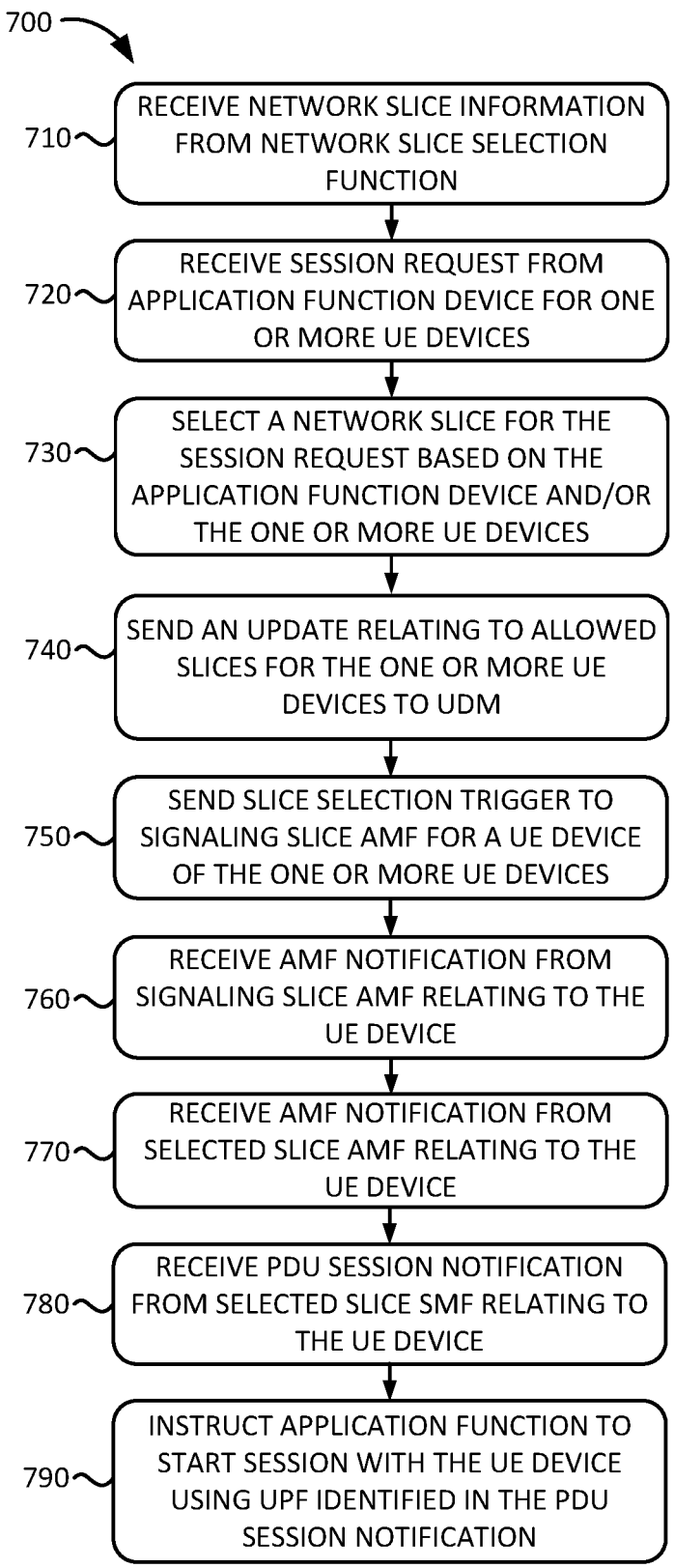
FIG. 7 is a flowchart of a first network slice selection process according to an implementation described herein.

FIG. 7 is a flowchart 700 of a first network slice selection process according to an implementation described herein. In some implementations, the process of FIG. 7 may be performed by NEF 260. In other implementations, some or all of the process of FIG. 7 may be performed by another device or a group of devices separate from NEF 260.

The process of FIG. 7 may include receiving network slice information from an NSSF 262 (block 710). For example, NSSF 262 may, at particular intervals, send information identifying the available network slices 320 in core network 130 to NEF 260. NEF 260 may store the network slice information in slice DB 520. A session request may be received from AF 250 for one or more UE devices 110 (block 720). For example, AF 250 may send a session request to NEF 260 to start a session with one or more UE devices 110. The session request may be initiated in response to AF 250 (or server device 280) receiving an application session request from UE device 110 or in response to AF 250 selecting to communicate with UE device 110 (e.g., to perform an application update, etc.). The session request may include information identifying one or more UE devices 110, information identifying an application associated with the session request, information identifying a particular network slice 320 associated with the session request, information identifying a service type associated with the session request, and/or other types of information associated with the session request.

A network slice may be selected for the session request based on AF 250 and/or the one or more UE devices (block 730). Slice manager 510 of NEF 260 may identify a network slice 320 associated with the session request based on information included in the session request and/or based on information stored in slice DB 520. For example, slice manager 510 may identify a particular network slice record 600 that includes the particular AF 250 from which the session request was received.

An update relating to allowed slices for the one or more UE devices 110 may be sent to UDM 252 (block 740). For example, NEF 260 may send an updated network slice list for UE device 110 to UDM 252. The updated network slice list may include information identifying UE device 110 and a list of network slice IDs that UE device 110 is allowed to access. UDM 252 may update the subscription profile for UE device 110 with the received network slice list. Furthermore, UDM 252 may inform signaling slice AMF 220-A that the allowed slice list for UE device 110 has been updated.

A slice selection trigger may be sent to a signaling slice AMF 220 for a particular UE device 110 of the one or more UE devices (block 750) and a notification from the signaling slice AMF 220 may be received relating to the particular UE device 110 (block 760). For example, NEF 260 may send a slice selection trigger to signaling slice AMF 220-A to be sent to the particular UE device 110. The slice selection trigger may include a UE device ID for the particular UE device 110, an NSSID identifying the selected network slice 320, a DNN identifying a particular data network 140 associated with the selected network slice 320, and a PDU type identifying the type of PDU connection (e.g., a particular QoS class, etc.) to be requested by the particular UE device 110.

If the signaling slice AMF 220-A is able to reach the particular UE device 110 and successfully send the slice selection trigger to the particular UE device 110, the signaling slice AMF 220-A may send a notification back to NEF 260 indicating that the slice selection trigger was successfully sent to the particular UE device 110. If the signaling slice AMF 220-A is unable to reach the particular UE device 110, signaling slice AMF 220-A may send an AMF notification to NEF 260 informing NEF 260 that the particular UE device 110 is not reachable and NEF 260 may notify AF 250 that the particular UE device 110 is not reachable.

An AMF notification may be received from a selected slice AMF 220 relating to the particular UE device 110 (block 770). After the particular UE device 110 requests a PDU session connection with a selected slice AMF 220 in the selected network slice, the selected slice AMF may send an AMF notification to NEF 260 indicating the particular UE device 110 has requested the PDU session connection. A PDU session notification may be received from a selected slice SMF 240 relating to the particular UE device 110 (block 780). For example, after the particular UE device 110 establishes a PDU session with a selected slice UPF 230, a selected slice SMF 240, which manages the selected slice UPF 230, may send a PDU session notification to NEF 260. The PDU session notification may include a UE device ID, an ID associated with UPF 230 (e.g., an IP address for UPF 230, etc.), a PDU session ID, a DNN, and/or other types of IDs that may be used by AF 250 to identify the PDU session.

In some implementations, NEF 260 may generate a slice selection trigger ID and include the slice selection trigger ID in the slice selection trigger sent to the signaling slice AMF 220-A. The slice selection trigger ID may subsequently be included in the AMF notification received from the selected slice AMF 220, and/or in the PDU session notification received from the selected slice SMF 240, and used by NEF 260 to associate the requested AMF notification and/or PDU session notification with the session request received from AF 250.

AF 250 may be instruction to start a session with the particular UE device 110 using the selected slice UPF 230 identified in the PDU session notification (block 790). For example, after NEF 260 receives the PDU session notification from the selected slice SMF 240, NEF 260 may send a message to AF 250, instructing AF 250 to start the session with the particular UE device 110 using the established PDU session. The message may include a UE device ID, a PDU session ID, and/or a UPF ID identifying the particular UPF 230 associated with the PDU session (e.g., an IP address for UPF 230, etc.).

Figure 8:
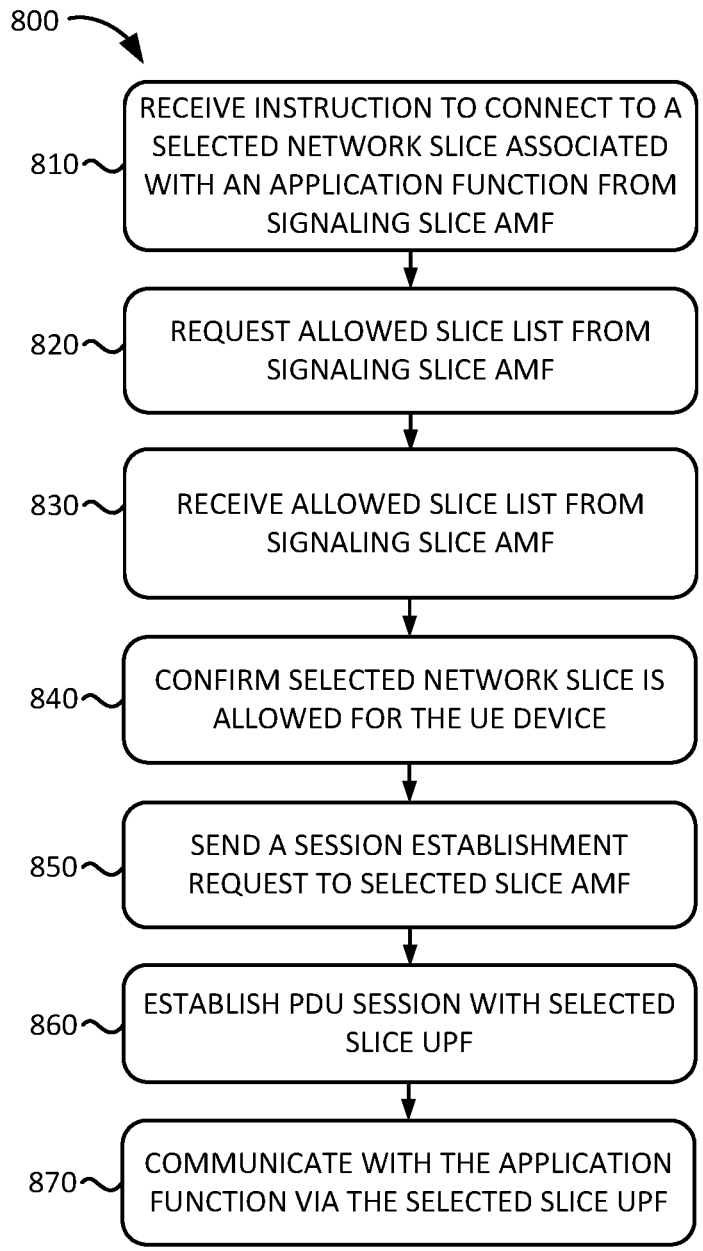
FIG. 8 is a flowchart of a second network slice selection process according to an implementation described herein.

FIG. 8 is a flowchart 800 of a second network slice selection process according to an implementation described herein. In some implementations, the process of FIG. 8 may be performed by UE device 110. In other implementations, some or all of the process of FIG. 8 may be performed by another device or a group of devices separate from UE device 110.

The process of FIG. 8 may include receiving an instruction to connect to a selected network slice associated with AF 250 from a signaling slice AMF 220-A (block 810). For example, UE device 110 may receive a slice selection trigger from the signaling slice AMF 220-A to request a connection via a particular network slice 320. The slice selection trigger may include an NSSID identifying the selected network slice 320, a DNN identifying a particular data network 140 associated with the selected network slice 320, and a PDU type identifying the type of PDU connection (e.g., a particular QoS class, etc.) to be requested by UE device 110.

An allowed slice list from the signaling AMF 220-A may be requested (block 820) and the allowed slice list may be received from the signaling AMF 220 (block 830). For example, UE device 110 may request an allowed slice list from the signaling AMF 220-A. AMF 220-A may obtain the allowed slice list from UDM 252 and provide the allowed slice list to UE device 110. UE device 110 may then update the list of network slices UE device 110 is configured to access. The allowed slice list may include an ID for a network slice AMF 220 for each of the allowed network slices.

A confirmation may be made that the selected network slice is allowed (block 840) and a session establishment request may be sent to the selected slice AMF 220 (block 850). UE device 110 may confirm that the selected network slice identified in the received slice selection trigger is included in the allowed slice list and may send a PDU session establishment request to a particular AMF 220, via gNodeB 210, identified in the allowed network slice list as being associated with the selected network slice 320.

A PDU session may be established with a selected slice UPF 230 (block 860) and a communication may be made with AF 250 or server device 280 via the selected slice UPF 230 (block 870). For example, the selected slice AMF 220 may send a PDU session request to a selected slice SMF 240. The selected slice SMF 240 may establish a PDU session with a selected slice UPF 230 and send a response to the selected slice AMF 220. The selected slice AMF 220 may then send a PDU session establishment accept message to gNodeB 210 and gNodeB 210 may send a Radio Resource Control (RRC) reconfiguration message to UE device 110, indicating the PDU session has been established. UE device 110 may then communicate with AF 250 (or server device 280) via the established PDU session.

Figure 9:
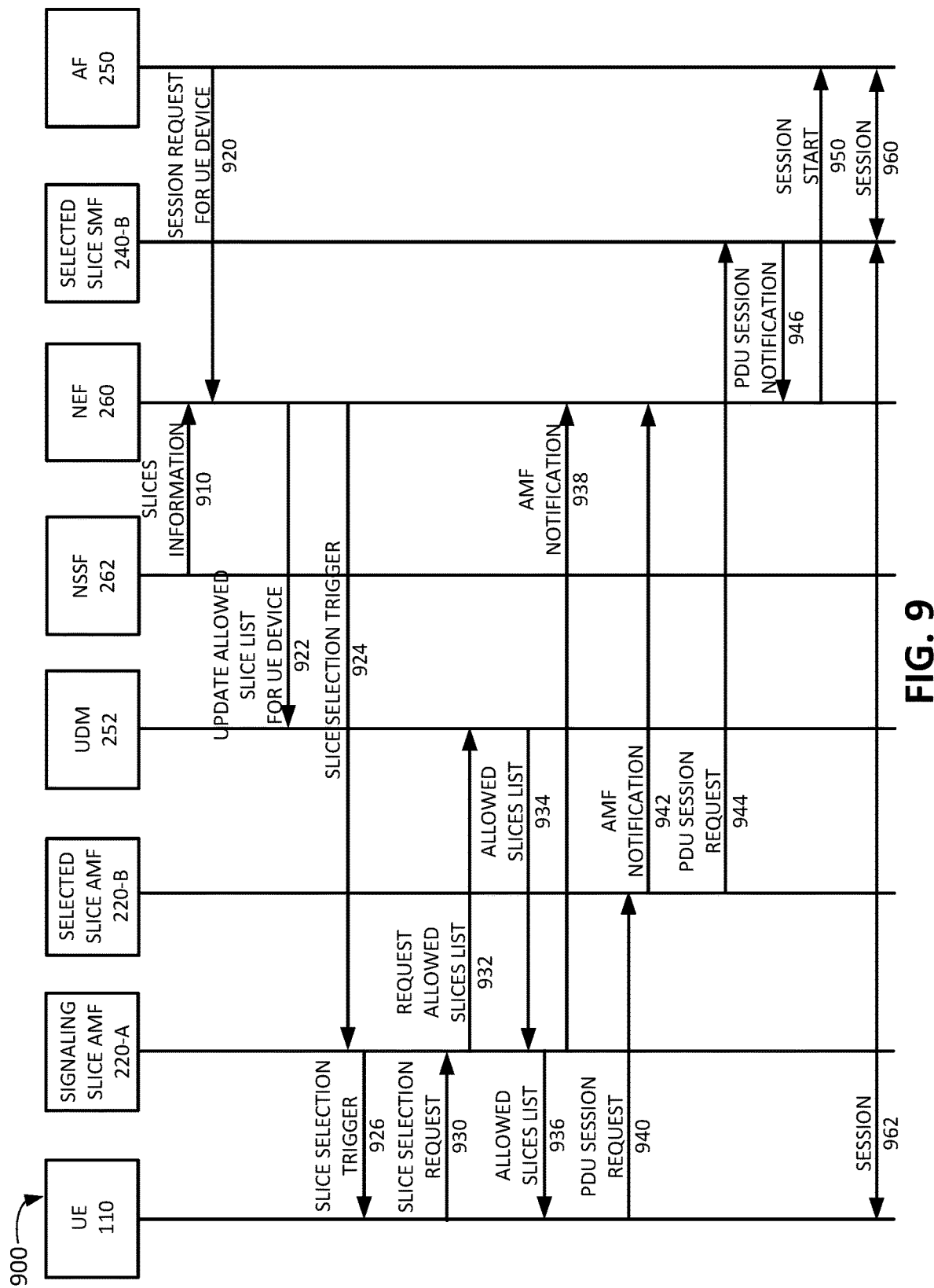
FIG. 9 is a diagram of an exemplary signal flow according to an implementation described herein.

FIG. 9 is a diagram of an exemplary signal flow 900 according to an implementation described herein. As shown in FIG. 9, signal flow 900 may include NSSF 262 sending network slice information to NEF 260 (signal 910). For example, each time a new network slice 320 is configured in core network 130, NSSF 262 may send a slice update to NEF 260 and NEF 260 may update slice DB 520 based on the information received from NSSF 262.

AF 250 may send a session request for UE device 110 to NEF 260 (signal 920). For example, UE device 110 may send an application session request to server device 280 and server device 280 may respond by sending the session request to AF 250. The session request may include a UE device ID, information identifying an application associated with the session request, information identifying a particular network slice 320 associated with the session request, information identifying a service type associated with the session request, and/or other types of information associated with the session request. In response, NEF 260 may send an updated allowed slices list to UDM 252 for UE device 110 (signal 922). The updated allowed slices list may include information identifying the particular network slice 320 associated with the session request.

Furthermore, NEF 260 may select the particular network slice 320 for UE device 110 and may send a slice selection trigger to signaling slice AMF 220-A (signal 924). The slice selection trigger may include a UE device ID for UE device 110, an NSSID identifying the selected network slice 320, a DNN identifying a particular data network 140 associated with the selected network slice 320, and/or a PDU type identifying the type of PDU connection (e.g., a particular QoS class, etc.) to be requested by UE device 110. Furthermore, in some implementations, the slice selection trigger may include a slice selection trigger ID. The signaling slice AMF 220-A may forward the slice selection trigger to UE device 110 (signal 926).

UE device 110 may send a slice selection request to the signaling slice AMF 220-A (signal 930) and the signaling slice AMF 220-A may request a list of the allowed slices for UE device 110 from UDM 252 (signal 932). UDM 252 may provide the requested allowed slices list to the signaling slice AMF 220-A (signal 934) and the signaling slice AMF 220-A may forward the allowed slices list to UE device 110 (signal 936). Furthermore, the signaling slice AMF 220-A may send an AMF notification to NEF 260, indicating that UE device 110 has received the slice selection trigger (signal 938).

UE device 110 may confirm that selected network slice 320 is on the allowed slices list, identify a selected slice AMF 220-B based on information included in the allowed slices list, and send a PDU session establishment request to the selected slice AMF 220-B (signal 940). The selected slice AMF 220-B may send an AMF notification to NEF 260 indicating that UE device 110 has requested a PDU session establishment (signal 942). Furthermore, the selected slice AMF 220-B may send a PDU session request to a selected slice SMF 240-B (signal 944) and the selected slice SMF 240-B may establish a PDU session between a selected slice UPF 230-B (not shown in FIG. 9) and UE device 110. The selected slice SMF 240-B may then send a PDU session notification to NEF 260 (signal 946). The PDU session notification may include a UE device ID for UE device 110, an ID associated with the selected slice UPF 230-B, a PDU session ID, a DNN, and/or other types of IDs that may be used by AF 250 to identify the PDU session.

NEF 260 may then send a message instructing AF 250 to establish a session with UE device 110 using the selected slice UPF 230-B (signal 950). The message may include a UE device ID for UE device 110, a PDU session ID, and/or a UPF ID identifying the selected slice UPF 230-B (e.g., an IP address for selected slice UPF 230-B, etc.). AF 250, or server device 280, may then communicate with UE device 110 using the established PDU session via the selected slice UPF 230-B managed by the selected slice SMF 240-B (signals 960 and 962).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals with respect to FIG. 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:
1. A method comprising:
receiving, by a computer device, a session request from an application function (AF) device for a user equipment (UE) device;
selecting, by the computer device, a network slice based on the AF device;
sending, by the computer device, a slice selection trigger to an Access and Mobility Function (AMF) device for the UE device in response to selecting the network slice, wherein the slice selection trigger includes an instruction to the UE device to request the selected network slice, and wherein the AMF device includes a signaling slice AMF device in a signaling network slice used to send instructions to UE devices to request a particular network slice, wherein the signaling slice AMF device is different from another AMF device used by the selected network slice;
receiving, by the computer device, a notification from a User Plane Function (UPF) device associated with the selected slice, wherein the notification identifies a Packet Data Unit (PDU) session between the UPF device and the UE device; and
instructing, by the computer device, the AF device to start a session with the UE device via the identified PDU session.

2. The method of claim 1, wherein the computer device implements a Network Exposure Function (NEF).

3. The method of claim 2, wherein the NEF includes a slice database that relates network slices to AF devices.

4. The method of claim 1, further comprising:
receiving, from a Network Slice Selection Function (NSSF) device, information relating to available network slices.

5. The method of claim 4, further comprising:
sending, to the AF device, an update relating to the available network slices, based on the received information relating to the available network slices.

6. The method of claim 1, further comprising:
sending, by the computer device, an allowed slices list for the UE device to a Unified Data Management (UDM) device based on the selected network slice.

7. The method of claim 1, further comprising:
receiving, by the computer device, a notification from a selected slice AMF device indicating that the UE device has requested a session using the selected network slice.

8. The method of claim 1, wherein the session request is received from the AF device via a Representational State Transfer (REST) Application Programming Interface (API).

9. The method of claim 1, wherein the selected network slice includes:
an enhanced Mobile Broadband (eMBB) network slice,
a massive Internet of Things (mIoT) network slice,
an Ultra-Reliable Low Latency Communication (URLLC) network slice, or
a Mobile Private Network (MPN) network slice.

10. A computer device comprising:
a memory storing instructions; and
a processor configured to execute the instructions to:
receive a session request from an application function (AF) device for a user equipment (UE) device;
select a network slice based on the AF device;
send a slice selection trigger to an Access and Mobility Function (AMF) device for the UE device in response to selecting the network slice, wherein the slice selection trigger includes an instruction to the UE device to request the selected network slice, and wherein the AMF device includes a signaling slice AMF device in a signaling network slice used to send instructions to UE devices to request a particular network slice, wherein the signaling slice AMF device is different from another AMF device used by the selected network slice;
receive a notification from a User Plane Function (UPF) device associated with the selected slice, wherein the notification identifies a Packet Data Unit (PDU) session between the UPF device and the UE device; and
instruct the AF device to start a session with the UE device via the identified PDU session.

11. The computer device of claim 10, wherein the computer device includes a Network Exposure Function (NEF).

12. The computer device of claim 11, wherein the NEF includes a slice database that relates network slices to AF devices.

13. The computer device of claim 10, wherein the processor is further configured to:
receive, from a Network Slice Selection Function (NSSF) device, information relating to available network slices, wherein the information relating to the available network slices includes information identifying a newly added slice to a network associated with the NSSF device.

14. The computer device of claim 13, wherein the processor is further configured to:
send an update relating to the available network slices to the AF device, based on the received information relating to the available network slices, wherein the update includes the information identifying the newly added slice to the network associated with the NSSF device.

15. The computer device of claim 10, wherein the processor is further configured to:
send an allowed slices list for the UE device to a Unified Data Management (UDM) device based on the selected network slice.

16. The computer device of claim 10, wherein the processor is further configured to:
receive a notification from a selected slice AMF device indicating that the UE device has requested a session using the selected network slice.

17. The computer device of claim 10, wherein the session request is received from the AF device via a Representational State Transfer (REST) Application Programming Interface (API).

18. A system comprising:
an Access and Mobility Function (AMF) device configured to:
perform access and mobility functions in a signaling network slice, wherein the signaling network slice is used to send instructions to user equipment (UE) devices to request a particular network slice; and
a Network Exposure Function (NEF) device configured to:
receive a session request from an application function (AF) device for a UE device;
select a network slice based on the AF device, wherein the AMF device is different from another AMF device used by the selected network slice;
send a slice selection trigger to the AMF device for the UE device in response to selecting the network slice, wherein the slice selection trigger includes an instruction to the UE device to request the selected network slice;
receive a notification from a User Plane Function (UPF) device associated with the selected slice, wherein the notification identifies a Packet Data Unit (PDU) session between the UPF device and the UE device; and
instruct the AF device to start a session with the UE device via the identified PDU session; and
wherein the AMF device is configured to:
send the slice selection trigger to the UE device.

19. The system of claim 18, wherein the NEF device includes a slice database that relates network slices to AF devices.

20. The system of claim 18, wherein the NEF device is further configured to:
receive, from a Network Slice Selection Function (NSSF) device, information relating to available network slices, wherein the information relating to the available network slices includes information identifying a newly added slice to a network associated with the NSSF device; and
send an update relating to the available network slices to the AF device, based on the received information relating to the available network slices, wherein the update includes the information identifying the newly added slice to the network associated with the NSSF device.

\* \* \* \* \*